Patented Nov. 3, 1936

2,059,811

UNITED STATES PATENT OFFICE 2,059,811

COMPOSITION OF MATTER FOR USE AS A VEHICLE FOR OTHER SUBSTANCES, AND A PROCESS OF PRODUCING THE SAME

Arthur Sauer, Zwingenberg/Hessen, Germany, assignor to Fissan Export Company Julius Bloch & Sohn, Frankfort-on-the-Main, Germany No Drawing. Application September 21, 1933, Serial No. 690,496. In Germany November 11, 1927

6 Claims. (Cl. 167—82)

This invention consists in producing a novel composition of matter, particularly for use as a vehicle for other substances. The novel composition consists of a silica xerogel, of a grain size ranging generally from 1 to $100\mu$, containing an acid fluorine or a compound of fluorine with a metalloid in adsorptive combination. The adsorptive combination of the fluorine compound is such that in the presence of moisture or water fluorine is liberated only very gradually in a highly diluted and bound form.

The novel composition, which may for example contain about 6 to 10% F. computed as HF, is entirely harmless to handle and has preservative, disinfectant and bactericidal properties. It can be used for example as a vehicle for various purposes, such as the preparation of therapeutic substances and cosmetics.

The new adsorbent can be produced from silicon fluoride by conversion with an aqueous solution of hydrofluosilicic acid and partial washing out of the precipitated solid.

The following procedure may be adopted:—

Into a chamber containing 400 litres of aqueous hydrofluosilicic acid (specific gravity 1.2) $SiF_4$ is introduced by suction. The $SiF_4$ required for the above quantity of hydrofluosilicic acid is obtained from 200 kg. fluorspar, 100 kg. quartz sand, 240 kg. crude sulphuric acid, 66 Bé. The temperature of the hydrofluosilicic acid is 20 to 25° and is increased by the reaction heat to about 40 to 50°.

Immediately following the introduction of the silicon fluoride a fog is formed in the chamber and a precipitate appears on the surface. This is removed from the chamber and washed, but the washing is discontinued as soon as there is no more acid reaction. In this way one obtains about 10 kg. of dry silica xerogel adsorbent having a high fluorine content.

The product contains an effective quantity of 7 to 10% F. It is very finely divisible and has an exceedingly low loose weight of about .05. The surface has a grained structure, and ranges from 100 to 150 square metres per gram, according to the temperatures used in preparing it.

The fluorine content of the adsorbent may be varied between wide limits. An adsorbent with a higher fluorine content it obtained by using hydrofluosilicic acid of higher concentration as a starting material, and by operating at higher temperatures. Hydrofluosilicic acid of lower concentration, for example of specific gravity 1.04 to 1.05 yields an adsorbent having a lower fluorine contact. Manufacturing at lower temperatures gives similar results. An adsorbent with less than 7% F. is obtained with hydrofluosilicic acid of specific gravity 1.15, produced at a temperature of 0–5°. Conversely, the adsorption capacity for foreign substances is greater when the adsorbent is produced at lower temperatures.

In some cases it may be desirable to counteract the effect of reaction heat by cooling, so as to keep down the temperature to the degree required in a particular case, especially if an adsorbent of low fluorine content is desired. The surface of the product is larger when the composition is produced with higher temperatures than in the case of lower temperatures.

The fluorine content may be further reduced by suitable washing out.

Tests applied according to the Debye-Scherrer process have shown that a pure adsorbent is obtained, that is to say an amorphous product of varying properties and not a unitary chemical compound.

In order to obtain a product which is as constant as possible, it is advisable to add, for the purpose of maintaining a uniform solution of hydrofluosilicic acid, such quantities of water as may be required for that purpose, and this may be done by introducing water in the form of steam. For example, atomized water or steam may be added to the silicon fluoride prior to the same being introduced into the solution of hydrofluosilicic acid at the start.

The new adsorbent may also be produced by associating colloidal silicic acid with fluorine compounds, or by causing fluorine compounds to react with silicic acid. Preferably, complex fluohydroxy salts are associated with silicic acid, e. g.

| | | |
|---|---|---|
| $SiF_4.2HF.H_2O$, $TiO_2F_2.2HF$, $HSi_2O_4F$, | $SiF_4.2HF.4H_2O$, $ZrOF_2.H_2O$, $SiO_2F_2.2HF$, | $CaF_2.2HF.6H_2O$, $ZrOF_2.2HF.2H_2O$, $Si(OH)_2.F_2(SiO_2.2HF)$. |

These compounds yield with silicic acid, an adsorbent, which in the presence of moisture liberates fluorine in bound form and in a state of comparatively high dilution. Thus, for example, if moisture is admitted to a silicic acid xerogel adsorbent with $Si(OH)_2F_2$, hydrofluoric acid is formed approximately according to the collowing equations:—

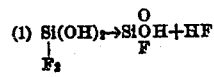

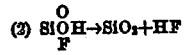

The novel composition is particularly useful as a vehicle in the preparation of powders, pastes and lotions for the treatment of the skin or body, and for protection against the influence of injurious substances. For producing medicinal substances and cosmetic preparations, metal salts, certain medicaments, albuminous substances, and generally substances required for curative treatment are added thereto. Among the salts that may be added zinc, mercury, silver and gold salts may be mentioned, and also copper salts and such salts as have a disinfecting effect or favourably react on other substances which it is intended to add.

As medicaments to be added or to be worked up in the production of the adsorbent, colloid metals or metalloids or compounds thereof may be considered, such as sulphur, boric acid and the like. In some cases these may be produced directly on the surface of the new adsorbent. Such boric acid or sulphur adsorbents have a volume hitherto not attained.

The adsorbent, which may contain salts, medicaments, and so on, is particularly suitable for association with diatomite earth. The adsorbent together with its added materials is finely distributed on the surface of the diatomite earth.

To the composition thus prepared albumen may be added. Or a preparation of colloidal silicic acid mixed with salts or medicinal substances is made, and a preparation of colloidal silicic acid mixed with albumen is made separately, and the two are combined, singly or together, with diatomite earth, either in advance or subsequently.

Albumen can be used in any form, also in the form of albumen preparations, milk albumen or milk albumen fat. In particular, partly decomposed, unstable milk albumen, which has not yet been decomposed to albumose, may be permanently fixed in this condition, so that it can be utilized for therapeutic and cosmetic purposes in the form of hydrogels or hydrosols. This may have a connection with the peculiar binding of fluorine to silicic acid, and certainly with the molecular constitution and the degree of loosening of the silicic acid, which is also influenced by the manufacturing temperature.

The curative substances or cosmetic preparations obtained are suitable for dermatological purposes, for example for the treatment of eruptions, ulcers or general skin diseases. Medicinal substances, especially for treating diseases of the intestines and other internal organs, can also be obtained.

The procedure may be as follows:—

The new adsorbent is combined with metal salt and diatomite earth and is treated for this purpose in a suitable machine, the colloid permitting a very finely divided disinfectant to be precipitated on the diatomite. In a second operation fresh, colloidal milk albumen, for example partly decomposed, is very finely divided and placed on the silicic acid colloid, which may be prepared by salt treatment and so on.

The term "xerogel" refers to masses of solid consistency, in which the solid phase constitutes the principal part and only a small quantity of liquid is present. The liquid phase is not bound strongly, and the xerogel may be separated from most of the liquid by suction or a similar operation.

Having now particularly described and ascertained the nature of the said invention and in what manner the same is to be performed, I declare that what I claim is:—

1. A composition of matter for use as a vehicle for the active substances in medicines, cosmetic and similar preparations, consisting of silicic acid xerogel having at least for the most part a grain size ranging from 1 to $100\mu$ and containing compounds of fluorine in adsorptive combination which react with water to release fluorine in bound form only very gradually and in a highly diluted form.

2. A composition of matter for use as a vehicle for the active substances in medicines, cosmetic and similar preparations, consisting of silicic acid xerogel having at least for the most part a grain size ranging from 1 to $100\mu$ and containing acid containing fluorine in adsorptive combination.

3. A composition of matter for use as a vehicle for the active substances in medicines, cosmetic and similar preparations, consisting of silicic acid xerogel having at least for the most part a grain size ranging from 1 to $100\mu$ and containing compounds of fluorine with metalloid in adsorptive combination which react with water to release fluorine in bound form only very gradually and in a highly diluted form.

4. A composition as claimed in claim 1, characterized in that the adsorptively combined quantity of pure fluorine computed as HF, amounts to about 6 to 10%.

5. A composition of matter for use as a vehicle for the active substances in medicines, cosmetic and similar preparations, comprising an intimate mixture of albumen with silicic acid xerogel having at least for the most part a grain size ranging from 1 to $100\mu$ and containing compounds of fluorine in adsorptive combination which react with water to release fluorine in bound form only very gradually and in a highly diluted form.

6. The process of producing a silicic acid xerogel comprising introducing silicon fluoride into an aqueous solution of hydrofluosilicic acid of a specific gravity of at least about 1.04, maintaining the concentration of the solution of hydrofluosilicic acid substantially constant by adding suitable quantities of water or steam during the introduction of silicon fluoride to the acid, thereby forming silicic acid, separating said silicic acid from the liquid, and partly washing the silicic acid so that fluorine compounds remain in adsorptive combination with the silicic acid.

ARTHUR SAUER.